United States Patent
Cavalieri et al.

(10) Patent No.: US 11,920,049 B2
(45) Date of Patent: Mar. 5, 2024

(54) LOW BAKE POWDER COATING RESINS

(71) Applicants: ALLNEX USA INC., Alpharetta, GA (US); ALLNEX ITALY SRL, Romano d'Ezzelino (IT)

(72) Inventors: Roberto Cavalieri, Romano d'Ezzelino (IT); Callistus Ugoh Ezeagu, Woodstock, GA (US)

(73) Assignees: ALLNEX USA INC, Alpharetta, GA (US); ALLNEX ITALY SRL, Romano d'Ezzelino (IT)

( * ) Notice: Subject to any disclaimer, the term of this patent is extended or adjusted under 35 U.S.C. 154(b) by 353 days.

(21) Appl. No.: 17/275,476

(22) PCT Filed: Oct. 28, 2019

(86) PCT No.: PCT/EP2019/079318
§ 371 (c)(1),
(2) Date: Mar. 11, 2021

(87) PCT Pub. No.: WO2020/089132
PCT Pub. Date: May 7, 2020

(65) Prior Publication Data
US 2022/0025207 A1    Jan. 27, 2022

Related U.S. Application Data

(60) Provisional application No. 62/751,797, filed on Oct. 29, 2018.

(30) Foreign Application Priority Data

Dec. 20, 2018  (EP) .................................... 18214348
Feb. 19, 2019  (EP) .................................... 19157915

(51) Int. Cl.
C08G 63/183    (2006.01)
C08L 67/02     (2006.01)
C09D 167/02    (2006.01)
B05D 1/12      (2006.01)

(52) U.S. Cl.
CPC ....... C09D 167/025 (2013.01); C08G 63/183 (2013.01); C08L 67/025 (2013.01); B05D 1/12 (2013.01); C08L 2205/03 (2013.01)

(58) Field of Classification Search
USPC .......................................................... 528/89
See application file for complete search history.

(56) References Cited

U.S. PATENT DOCUMENTS 5,043,401 A * 8/1991 Matsuzaki ........... C08G 59/226
                                                    525/934
6,350,825 B1 * 2/2002 Finter .................... C08G 59/38
                                                    525/934

FOREIGN PATENT DOCUMENTS

| CN | 103601872 | 2/2014 | |
| EP | 3 133 130 | 2/2017 | |
| EP | 3133130 A1 * | 2/2017 | ........... C09D 163/00 |
| JP | 8-283656 | 10/1996 | |
| JP | 2002-235032 | 8/2002 | |
| JP | 2006-70082 | 3/2006 | |
| JP | 2010-155893 | 7/2010 | |
| KR | 10-2007-0070602 | 7/2007 | |
| KR | 20070070602 A * | 7/2007 | |
| WO | 96/24628 | 8/1996 | |
| WO | 2004/067550 | 8/2004 | |
| WO | 2016/012252 | 1/2016 | |
| WO | 2018/007373 | 1/2018 | |
| WO | 2018/150038 | 8/2018 | |

OTHER PUBLICATIONS

KR20070070602A machine translation (Year: 2007).*
EP-3133130-A1 abstract (Year: 2017).*
International Search Report (ISR) dated Jan. 14, 2020 in International (PCT) Application No. PCT/EP2019/079318.

* cited by examiner

*Primary Examiner* — Terressa Boykin
(74) *Attorney, Agent, or Firm* — WENDEROTH, LIND & PONACK, L.L.P.

(57) ABSTRACT

Powder coating compositions for low temperature cure between 100° C. and 150° C. The powder coating compositions contain: a) a carboxylic acid functional resin A which is a polyester resin A having carboxylic acid groups, b) a first glycidyl functional resin B1 which is a bisphenol A based epoxy resin having glycidyl groups, c) a second glycidyl functional resin B2 which is a phenol or cresol epoxy novolac resin having glycidyl groups, and d) at least one thermosetting curing catalyst C. Such powder coating compositions may exhibit, upon curing, an excellent combination of physical properties such as smoothness, flexibility, hardness and, above all, an outstanding durability for the MEK impregnation test.

16 Claims, No Drawings

LOW BAKE POWDER COATING RESINS

FIELD OF THE INVENTION

The present invention relates to powder coating compositions for low temperature cure which comprise a carboxylic acid group containing polyester resin, epoxy resin reactable with the carboxylic acid group and a thermosetting curing catalyst.

These thermosetting powder coatings are designed for coating heat-sensitive substrates such as wood, fibre board, fiber-glass, assembled metallic materials and other materials which cannot withstand the excessive heat/time conditions necessary to cure traditional powder coating compositions. The powder coating compositions of the invention, when cured at temperatures lower than 150° C., produce a finish which exhibits a high gloss, smooth surface along with an outstanding flexibility and solvent resistance.

Furthermore, the present powder coating composition, when combined with a specific powder coating composition of different reactivity, is able to provide a low gloss finish coating maintaining comparable flexibility and solvent resistance, still at these low temperature curing conditions. Powder coating compositions, which are dry, finely divided, free flowing, solid materials at room temperature have gained considerable popularity in recent years over liquid coating compositions.

Nowadays thermosetting powder coating compositions are generally cured at rather high temperatures, such as at least 150° C., or at least 160° C. and above. Below this recommended temperature the coatings have poor appearance as well as poor physical and chemical properties. In consequence of this restriction, powder coating compositions are generally not employed in coating heat-sensitive substrates such as wood and plastic or assembled metallic parts containing heat-sensitive components. Heat-sensitive substrates or components both demand low curing temperatures, preferably below 140° C., to avoid significant degradation and/or deformation. Low temperature curable powder compositions are also desirable for heat resistant substrates such as metal as it can reduce manufacturing time and cost, requiring less energy to obtain full curing.

DESCRIPTION OF THE RELATED ART

Low temperature thermosetting powder coating compositions have been proposed as a solution to this problem since years.

For example WO 96/24628 describes powder coatings compositions based on specific epoxy resins obtained from the reaction at high temperature of bisphenol A based epoxy resins with pre-heated epoxidized phenol-formaldehyde resin. Phenol-formaldehyde (novolac) epoxidized resins are added to reduce the viscosity of the resin (reactive diluent) and to improve the flow-out of the coating.

Oppositely the physical blending of the epoxy resins is shown as not providing similar flexibility/mechanical requirements as reported in example 2 (OK) vs comparative example 3.

WO 2004067650 describes resins for powder coatings which are radiation curable. The radiation cure is done, after melting at relatively low temperature (140° C. for 30 minutes), but such curable compositions require special equipment to provide radiation curing (UV or electron beam equipped oven is needed).

WO 2016012252, WO 2016012253 and WO 2016012254 describe powder coatings for low gloss applications obtained combining two powder coatings of different reactivity based on polyester resin with carboxylic acid groups and bisphenol A based epoxy resin. The powder compositions are considered as "low bake" when they are able to be cured at 160° C.

WO 2018007373 describes a low temperature curable powder coating composition comprising a poly-acid functional polyester component A, a poly-epoxy functional component B, a poly-anhydride functional component C; and a thermosetting curing catalyst D. This composition requiring the presence of poly-anhydride functional component C acting as plasticizer is more expensive and valid only for a specific combination of polyester and epoxy hardener.

WO 2018150038 describes a powder coating composition containing (semi)crystalline components for low temperature curing. The binder comprises at least 3 components: an amorphous polyester resin, a (semi)cristalline resin and an epoxy resin, which is typically a bisphenol A and phenol novolac epoxy resin. The presence of (semi)crystalline resin is negatively impacting the handling of the coating which is more difficult to solidify after the extrusion and to be grinded. Moreover, the final powder coating composition tends to build lumps during storage in normal conditions.

SUMMARY OF THE INVENTION

It is accordingly an object of the present invention to provide a powder coating composition, capable of being thermally cured at low temperature ("low bake" compositions), which can result in a coating, after curing at low temperature as hereinafter defined exhibiting an excellent solvent resistance even if saturated with solvents. Moreover, the film obtained upon curing the powder coating composition may have an excellent combination of physical properties such as smoothness, flexibility (cupping), hardness and resistance to yellowing.

It has been now surprisingly found that thermally curable powder coating compositions based on a binder comprising a mixture of at least one polyester resin with thermal carboxylic acid groups, at least one specific combination of bisphenol A epoxy resin and phenol or cresol epoxy resin and a curing catalyst, may exhibit, upon curing, an excellent combination of physical properties such as smoothness, flexibility, hardness and, above all, an outstanding durability for the MEK impregnation test.

Therefore there is provided a powder coating composition for low temperature cure which comprises:
  a. a carboxylic acid functional resin A which is a polyester resin A having carboxylic acid groups,
  b. a first glycidyl functional resin B1 which is a bisphenol A based epoxy resin having glycidyl groups,
  c. a second glycidyl functional resin B2 which is a phenol or cresol epoxy novolac resin having glycidyl groups, and
  d. At least one thermosetting curing catalyst C.

In another aspect of the invention, the powder coating composition is combined with a second composition of the same type but of different reactivity to provide matt coatings.

Therefore, the above defined composition is mixed in dry-blend with a powder coating comprising:
  a. At least one carboxylic acid group containing polyester resin D,
  b. At least one bisphenol A based epoxy resin E1,
  c. Optionally at least one phenol or cresol epoxy novolac resin E2, and
  d. Optionally one thermosetting curing catalyst F.

Such modified powder coating composition is able to provide a low temperature low gloss (matt), very smooth, good solvent resistant and flexible powder coating.

Definitions

By "low temperature cure" is meant to designate curing at temperatures below 150° C., for example from 100° C. to 150° C. The temperature cure is preferably below 140° C., for example from 100° C. to 140° C. Upon application and curing at those temperatures, the coating compositions of the invention permit to obtain very smooth, high gloss finishes, proving good solvent resistance and flexibility.

A "resin" is typically a polymer having functional groups which is able to cure or crosslink via reactions involving its functional groups, said reactions being induced by means of heat (thermoset compositions) and/or radiation (for radiation curable compositions), connecting the polymer chains together through the formation of permanent covalent (crosslink) bonds, resulting to a cured resin.

By "functional group" is meant herein a covalently bonded group of atoms within a molecule, such as for example a carboxylic acid group (—COOH), a hydroxyl group (—OH) or an oxirane (also called glycidyl or epoxide) group, which is capable of reacting with a functional group of another molecule. For example a carboxylic acid functional polyester resin contains carboxylic acid functional groups that are capable of reacting with the functional groups of another molecule, for example an epoxy resin containing epoxide groups.

The terms "amorphous" and "crystalline" (sometimes including "semi-crystalline") used to characterize a resin or a thermosetting powder coating composition, are informal terms used in the art to indicate the predominant character of the relevant resin or thermosetting powder coating composition, in respect to its degree of crystallinity. An amorphous resin does not have a melting temperature (Tm) as it melts over a range of temperature whereas a crystalline resin typically has a Tm. An amorphous resin is typically defined by its Tg. In case in which a crystalline resin has a Tg, then its Tg is lower than its Tm. By "Tg" is meant herein the glass transition temperature. The Tg is measured using DSC (Differential Scanning Calorimetry) as described herein.

The curing of the thermosetting powder coating composition of the invention takes place using heat and can be called "heat curing" for example using IR (infrared) lamps. For clarity, the term heat curing does not include radiation curing such as ultraviolet (UV) or electron beam induced curing.

A curable thermosetting powder coating composition is applied on an object, for example an article, and forms, after heat curing, a film or coating on the substrate. Such coating can be called a paint typically when the composition contains pigment(s).

By "mixture" or "physical mixture" is meant a composition obtained by bringing 2 or more components together without chemical transformation and/or without any process involving for example a chemical reaction between the components, taking place. For example a "dry-blend" mixture is obtained by the physical mixture of 2 components or powder compositions without application of heat.

A composition containing functional resins and, when present, curing catalyst, these functional resins being able to react together to form upon cure (i.e. upon crosslinking) the cured composition, is often called the binder component of a coating composition. Other components like pigments, flow additives etc can be added to the binder to form the final composition applied on the object to form after curing a coating on the object.

DETAILED DESCRIPTION OF THE INVENTION

Polyester Resin A

The carboxylic acid group containing polyester A of the present invention is a polyester resin which is a carboxylic acid functional polyester. It is typically obtainable by reacting a polyol with a diacid and/or its anhydride to form a hydroxyl functional polyester, which is then reacted with a polybasic organic carboxylic acid (polycarboxylic acid) and/or its anhydride.

The carboxylic acid group containing polyester resin A of the invention in general has an acid number of at least 50, preferably at least 60, more preferably at least 65 mg KOH/g.

The acid number of this first polyester resin A in general is at most 90, preferably at most 80, more preferably at most 75 mg KOH/g.

Advantageously this polyester resin A has a hydroxyl number of less than 10 mg KOH/g.

The diacid constituents of polyester A in general are composed of from 50 to 90 molar percent of terephthalic acid, and of from 0 to 40 molar percent of another diacid constituent selected from one or more aliphatic, cycloaliphatic and/or aromatic diacids, such as: isophthalic acid, fumaric acid, maleic acid, phthalic anhydride, 1,4-cyclohexanedicarboxylic acid, 1,3-cyclohexanedicarboxylic acid, 1,2-cyclohexanedicarboxylic acid, succinic acid, adipic acid, glutaric acid, pimelic acid, suberic acid, azealic acid, sebacic acid, 1,12-dodecanedioic acid, undodecanedioic acid, tridecanedioic acid, tetradecanedioic acid or the corresponding anhydrides and any mixture thereof.

By polybasic organic carboxylic acid is meant in to designate organic compounds comprising at least 3 carboxylic acid groups. The polybasic organic acid can be used in acid form, in anhydride form or as a mixture of acids and anhydrides. The polybasic organic acids of polyester A in general are present as from 5 to 20 molar percent of the total acids and/or anhydrides of the polyester A. The polybasic organic acids are preferably selected from trimellitic acid, pyromellitic acid, trimellitic anhydride and pyromellitic anhydride and any mixture thereof. Trimellitic anhydride is most preferred.

The carboxylic acid functional polyester resins A according to the present invention are preferably prepared from the ring-opening reaction of the anhydride group of at least one, and more preferably at least 1.5 mole, of anhydride of the polybasic organic carboxylic acid per mole of hydroxyl functional polyester.

Advantageously the functionality of the first polyester A is higher than 2.0, preferably 2.3 and more preferably 2.5 (functionality defined as the average number of acid groups per molecule as by "calculated Mn"/(56100/AV).

The polyol constitutent the first polyester A can contain 2 OH groups, for example a glycol, or at least 3 OH groups, such as for example glycerine.

Such glycol can be composed of from 40 to 100 molar percent of neopentyl glycol, and from 0 to 60 molar percent of another glycol constituent selected from one or more aliphatic and/or cycloaliphatic glycols, such as: ethylene glycol, diethylene glycol, 1, 3 propanediol, propylene glycol, 1, 4-butanediol, 1, 6-hexanediol, 1, 4-cyclohexanediol, 1, 4-cyclohexanedimethanol, 2-methyl-1, 3-propanediol, 2-butyl-2-ethyl-1, 3-propanediol, hydrogenated Bisphenol A, hydroxypivalate of neopentyl glycol, trimethylolpropane, ditrimethylolpropane, pentaerythritol.

The carboxyl functional polyester resin A of the present invention advantageously has a number average molecular weight (Mn) as determined by gel permeation chromatography (GPC) of at least 1000, preferably at least 1400. The Mn of this polyester resin A preferably is at most 10000, more in particular is at most 5000, as determined by GPC (using polystyrene standards and tetrahydrofuran as eluent, at 35° C.).

Advantageously the carboxyl functional polyester resin A of the present invention is an amorphous polyester. Semi-crystalline polyesters as mentioned are more difficult to handle during the synthesis and in the powder coating formulation. It's more difficult to solidify and grind the resin after casting and the same during the coating preparation, with difficulties to solidify the coating and successively during the grinding. Later during the storage the coating tends to build lumps.

The carboxyl functional polyester resin A of the invention advantageously has a glass transition temperature, measured by Differential Scanning Calorimetry (DSC) according to ASTM D3418 with a heating gradient of 10° C. per minute, of from 30 to 90° C. Preferably this polyester resin A has a glass transition temperature above 40° C., more preferably above 45° C.

The carboxyl functional polyester resin A of the invention advantageously has a Brookfield cone and plate viscosity according to ASTM D4287-88, measured at 175° C., ranging from 1000 to 10000 mPa·s.

Component B1: Bisphenol A Epoxy Resin

Component B1 is an epoxy resin which is obtainable by the reaction of Bisphenol A and epichlorohydrin. This bisphenol A based epoxy resin can be prepared from the reaction of Bisphenol A and epichlorohydrin, wherein the excess of epichlorohydrin determines the number average molecular weight of the epoxy resin (W. G. Potter: Epoxide Resins, Springer-Verlag, New York 1970; Y. Tanaka et al. (eds.): Epoxy Resins Chemistry and Technology, Marcel Dekker, New York 1973, Chapter 2, pp. 9-134).

Commercial examples of available bisphenol A based epoxy resins are: D.E.R 661, D.E.R 6116, D.E.R. 662, D.E.R. 663, D.E.R. 671 from Dow Chemical/Olin; Araldite GT 7004, Araldite GT 6248, Araldite GT 7071, Araldite GT 7072 from Huntsman/Jana; KD-211E, KD-211G, YD-012, KD-242G from Kukdo, Epotec epoxy YD901, and YD901H from Aditya Birla Chemicals.

The bisphenol A based epoxy resin component B1 of the present invention is glycidyl functional. It preferably has an epoxy equivalent weight of at least 450, preferably at least 465, more preferably at least 500 g/eq. The epoxy equivalent weight of the bisphenol A based epoxy resin B1 is preferably at most 725, more preferably at most 675, even more preferably at most 575 g/eq.

The bisphenol A based epoxy resin B1 of the present invention advantageously has a number average molecular weight (Mn) as determined by gel permeation chromatography (GPC) of at least 500, preferably at least 700, preferably at least 1000. The Mn of this bisphenol A based epoxy resin B1 preferably is at most 3000, more in particular is at most 2000, as determined by GPC (using polystyrene standards and tetrahydrofuran as eluent, at 35° C.).

The bisphenol A based epoxy resin B1 of the invention advantageously has a glass transition temperature, measured by Differential Scanning Calorimetry (DSC) according to ASTM D3418 with a heating gradient of 10° C. per minute, of from 30 to 45° C. Preferably this bisphenol A based epoxy resin B1 has a glass transition temperature above 34° C., more preferably above 36° C.

The bisphenol A based epoxy resin B1 of the invention advantageously has a Brookfield cone and plate viscosity according to ASTM D4287-88, measured at 150° C., ranging from 300 to 1500 mPa·s.

Advantageously the functionality of the bisphenol A based epoxy resin B1 is lower than 2.0, (functionality defined as the average number of acid groups per molecule as by "calculated Mn"/EEW).

Component B2

The phenol or cresol epoxy novolac resin component B2 of the present invention relates to an epoxy novolac resin having glycidyl functional groups.

A phenol, cresol, resorcinol, xylenol, naphthol novolac can be prepared by the acid-catalysed condensation of formaldehyde with either phenol, cresol etc. Epoxidation of the novolacs with epichlorohydrin furnishes the epoxy novolacs.

Examples of commercially available epoxy novolacs resins are: Araldite GY280, Kukdo YDCN 500-90P, YDCN-500-80P.

The phenol or cresol epoxy novolac resin B2 of the present invention preferably has an epoxy equivalent weight of at least 190 g/equivalent. Preferably it has an epoxy equivalent weight comprised between 190 and 230 g/eq.

The phenol or cresol epoxy novolac resin B2 of the present invention advantageously has a number average molecular weight (Mn) as determined by gel permeation chromatography (GPC) of at least 700, preferably at least 1200. The Mn of this phenol or cresol epoxy novolac resin B2 preferably is at most 2000, more in particular is at most 1800, as determined by GPC (using polystyrene standards and tetrahydrofuran as eluent, at 35° C.).

The phenol or cresol epoxy novolac resin B2 of the invention advantageously has a glass transition temperature, measured by Differential Scanning Calorimetry (DSC) according to ASTM D3418 with a heating gradient of 10° C. per minute, of from 38 to 53° C. Preferably this phenol or cresol epoxy novolac resin B2 has a glass transition temperature above 41° C., more preferably above 43° C. The glass transition temperature of phenol or cresol epoxy novolac resin B2 is preferably higher than the one of the bisphenol A based epoxy resin.

The phenol or cresol epoxy novolac resin B2 of the invention advantageously has a Brookfield cone and plate viscosity according to ASTM D4287-88, measured at 150° C., ranging from 1500 to 5000 mPa·s.

Advantageously the functionality of the phenol or cresol epoxy novolac resin B2 is comprised between 3.0 and 6.0 (functionality defined as the average number of glycidyl groups per molecule as by "calculated Mn"/EEW).

Advantageously the ratio between equivalents of bisphenol A epoxy resin (number of moles of epoxy groups in B1 resin) and equivalents of phenol or cresol epoxy novolac resin (number of moles of epoxy groups in B2) is comprised between 70/30 to 55/45. Advantageously the ratio between equivalents of carboxylic acid group of polyester A (number of moles of carboxylic groups in resin A) and equivalents of component B (i.e. the sum of epoxy groups in B1 and B2) is comprised between 25/75 to 55/45, preferably between 25/75 to 45/55.

It is important in the present invention to use both types of epoxy resins B1 and B2 in combination with polyester resin A. It was observed that the physical mixture of distinct resins B1 and B2 can provide better results than using an epoxy resin having novolac and bisphenol A parts chemically combined after reaction at high temperature as reached by the prior art. The physical mixture of resins B1 and B2 allows broader freedom of choosing components, at lower cost and easier manufacture and may provide better results in terms of obtained properties.

Catalyst C

The thermosetting curing catalyst C can be selected from the group consisting of amines, imidazoles, phosphines, ammonium salts, phosphonium salts, blocked amine or phosphine catalysts, encapsulated catalysts and combinations thereof, preferably combination of arylphosphoniumhalogenide and imidazoles, more preferably ethyl-triphenylphosphonium bromide with 2-methyl-imidazole.

The total % of thermosetting curing catalyst C in the binder is between 0.8 and 3%. When a combination of catalysts is used, the ratio between 2 catalysts can be between 0/100 to 100/0.

In one embodiment, the powder coating composition according to invention does not comprise crystalline or semi-crystalline carboxyl group containing polyester resins with an arithmetic averaged acid number of 15 to 80 mg KOH/g. More preferably, the composition according to invention does not comprise crystalline or semi-crystalline carboxyl group containing polyester resins. The presence of (semi)crystalline resin is negatively impacting the handling of the coating and would lead to a composition that is more difficult to solidify after the extrusion and more difficult to be grinded. Moreover, the final powder coating composition comprising (semi)crystalline resin tends to build lumps during storage in normal conditions.

In this embodiment, the average acid number is calculated from the acid number of the individual polyester resin component and its proportion in the crystalline or semi-crystalline carboxyl group containing polyester resins. The carboxyl-containing crystalline or semicrystalline polyester resins excluded from the composition of the invention are those that are based on polycarboxylic acids and polyols. The polycarboxylic acids are e.g. linear, aliphatic dicarboxylic acids having 2 to 22 methylene groups and/or terephthalic acid/isophthalic acid in amounts of at least 85 mol %, based on the total amount of all polycarboxylic acids used. As polyols can be used. e.g. inter alia (cyclo)aliphatic alcohols having 2 to 10 C atoms. Examples of excluded (semi) crystalline or crystalline polyester resins are those made from polycarboxylic acids such as succinic acid and/or its anhydrides or derivatives and, as polyol, 1,4-butanediol.

Optional Polyester Resin D

The optional polyester resin D is typically a carboxylic acid group containing polyester. It is typically obtainable by reacting a polyol with a diacid and/or its anhydride to form a hydroxyl functional polyester, which is then reacted with a polybasic organic carboxylic acid (polycarboxylic acid) and/or its anhydride.

Preferably this polyester resin D has an acid number of at most 40 mg KOH/g. The carboxylic acid group containing polyester D of the invention in general has an acid number of at most 30, preferably at most 25, more preferably at most 22 mg KOH/g. The acid number of this polyester D in general is at least 10, preferably at least 14, more preferably at least 17 mg KOH/g.

Advantageously this polyester D has a hydroxyl number of less than 7 mg KOH/g.

The diacid constituents of polyester D in general are composed of from 70 to 100 molar percent of terephthalic acid, and of from 0 to 30 molar percent of another diacid constituent selected from one or more aliphatic, cycloaliphatic and/or aromatic diacids, such as: isophthalic acid, fumaric acid, maleic acid, phthalic anhydride, 1,4-cyclohexanedicarboxylic acid, 1,3-cyclohexanedicarboxylic acid, 1,2-cyclohexanedicarboxylic acid, succinic acid, adipic acid, glutaric acid, pimelic acid, suberic acid, azealic acid, sebacic acid, 1,12-dodecanedioic acid, undodecanedioic acid, tridecanedioic acid, tetradecanedioic acid or the corresponding anhydrides and any mixture thereof.

By polybasic organic carboxylic acid is meant in to designate organic compounds comprising at least 3 carboxylic acid groups. The polybasic organic acids of polyester D in general are present as from 0 to 2 molar percent of the total acids and/or anhydrides of polyester D. The polybasic acid or anhydride is preferably selected from trimellitic acid, pyromellitic acid, trimellitic anhydride and pyromellitic anhydride and any mixture thereof. Trimellitic anhydride is most preferred.

The polyol constituent of the second polyester D can be a diol, for example a glycol, or a triol such as glycerine.

Such glycol can be composed of from 70 to 100 molar percent of neopentyl glycol, and from 0 to 30 molar percent of another glycol constituent selected from one or more aliphatic and/or cycloaliphatic glycols, such as: ethylene glycol, diethylene glycol, 1, 3 propanediol, propylene glycol, 1, 4-butanediol, 1, 6-hexanediol, 1, 4-cyclohexanediol, 1, 4-cyclohexanedimethanol, 2-methyl-1, 3-propanediol, 2-butyl-2-ethyl-1, 3-propanediol, hydrogenated Bisphenol A, hydroxypivalate of neopentyl glycol, trimethylolpropane, ditrimethylolpropane, pentaerythritol.

The carboxyl functional polyester D of the present invention advantageously has a number average molecular weight (Mn) as determined by gel permeation chromatography (GPC) of at least 2000, preferably at least 3000. The Mn of this first polyester A preferably is at most 10000, more in particular is at most 5000, as determined by GPC (using polystyrene standards and tetrahydrofuran as eluent, at 35° C.).

The carboxyl functional second polyester D of the invention advantageously has a glass transition temperature, measured by Differential Scanning Calorimetry (DSC) according to ASTM D3418 with a heating gradient of 10° C. per minute, of from 30 to 90° C. Preferably this second polyester D has a glass transition temperature above 40° C., more preferably above 45° C.

The carboxyl functional second polyester D of the invention advantageously has a Brookfield cone and plate viscosity according to ASTM D4287-88, measured at 200° C., ranging from 3000 to 20000 mPa·s.

Advantageously the carboxyl functional second polyester D of the present invention is an amorphous polyester.

Advantageously the functionality of the second polyester D is lower than 2.2, preferably 2.1 or 2.0 or 1.8 and more preferably lower than 1.5 (functionality defined as the average number of acid groups per molecule as by "calculated Mn"/(56100/AV).

Optional Resin E1

The bisphenol A based epoxy resin E1 of the present invention is a glycidyl functional epoxy resin which can be prepared from the reaction of Bisphenol A and epichlorohydrin.

Said bisphenol A based epoxy resin E1 can be prepared from the reaction of Bisphenol A and epichlorohydrin, wherein the excess of epichlorohydrin determines the number average molecular weight of the epoxy resin (W. G. Potter: Epoxide Resins, Springer-Verlag, New York 1970; Y. Tanaka et al. (eds.): Epoxy Resins Chemistry and Technology, Marcel Dekker, New York 1973, Chapter 2, pp. 9-134).

Commercial examples of available bisphenol A based epoxy resins, are D.E.R. 662, D.E.R. 663, D.E.R. 671 from Dow Chemical/Olin; Araldite GT 7004, Araldite GT 6248, Araldite GT 7071, Araldite GT 7072, from Huntsman/Jana; KD-211E, KD-211G, YD-012, KD-242G from Kukdo.

The bisphenol A based epoxy resin E1 of the present invention has preferably an epoxy equivalent weight of at least 450 g/equivalent. Preferably, resin E1 has an epoxy equivalent weight of at least 450, preferably at least 465, more preferably at least 500 g/eq. The epoxy equivalent weight of the bisphenol E based epoxy resin is at most 725, preferably at most 675, more preferably at most 575 g/eq.

The bisphenol A based epoxy resin E1 of the present invention advantageously has a number average molecular weight (Mn) as determined by gel permeation chromatography (GPC) of at least 500, preferably at least 1000. The Mn of this bisphenol A based epoxy resin E1 preferably is at most 3000, more in particular is at most 2000, as determined by GPC (using polystyrene standards and tetrahydrofuran as eluent, at 30° C.).

The bisphenol A based epoxy resin E1 of the invention advantageously has a glass transition temperature, measured by Differential Scanning Calorimetry (DSC) according to ASTM D3418 with a heating gradient of 10° C. per minute, of from 30 to 45° C. Preferably this bisphenol A based epoxy resin E1 has a glass transition temperature above 34° C., more preferably above 36° C.

The bisphenol A based epoxy resin E1 of the invention advantageously has a Brookfield cone and plate viscosity according to ASTM D4287-88, measured at 150° C., ranging from 300 to 1500 mPa·s.

Advantageously the functionality of the bisphenol A based epoxy resin E1 is lower than 2.0, (functionality defined as the average number of acid groups per molecule as by "calculated Mn"/EEW).

Optional Resin E2

The optional phenol or cresol epoxy novolac resin E2 of the present invention is an epoxy novolac resin having glycidyl functionality.

A phenol, cresol, resorcinol, xylenol, naphthol novolac can be prepared by the acid-catalysed condensation of formaldehyde with either phenol or cresol etc. Epoxidation of the novolacs with epichlorohydrin furnishes the epoxy novolacs.

Commercially examples of available epoxy novolacs resins are: Araldite GY280, Kukdo YDCN 500-90P, YDCN-500-80P.

The resin E2 has preferably an epoxy equivalent weight of at least 190 g/equivalent. Preferably it has an epoxy equivalent weight between 190 and 230 g/eq.

The resin E2 of the present invention advantageously has a number average molecular weight (Mn) as determined by gel permeation chromatography (GPC) of at least 700, preferably at least 1200. The Mn of this phenol or cresol epoxy novolac resin E2 preferably is at most 2000, more in particular is at most 1800, as determined by GPC (using polystyrene standards and tetrahydrofuran as eluent, at 35° C.).

The phenol or cresol epoxy novolac resin E2 of the invention advantageously has a glass transition temperature, measured by Differential Scanning Calorimetry (DSC) according to ASTM D3418 with a heating gradient of 10° C. per minute, of from 38 to 53° C.

Preferably this phenol or cresol epoxy novolac resin E2 has a glass transition temperature above 41° C., more preferably above 43° C. The glass transition temperature of phenol or cresol epoxy novolac resin E2 is preferably higher than the one of the bisphenol A based epoxy resin E1.

The phenol or cresol epoxy novolac resin E2 of the invention advantageously has a Brookfield cone and plate viscosity according to ASTM D4287-88, measured at 150° C., ranging from 1500 to 5000 mPa·s.

Advantageously the functionality of the phenol or cresol epoxy novolac resin E2 is comprised between 3.0 and 6.0, (functionality defined as the average number of glycidyl groups per molecule as by "calculated Mn"/EEW).

Advantageously the ratio between equivalents of bisphenol A epoxy resin E1 and equivalents of phenol or cresol epoxy novolac resin E2 is between 100/0 to 90/10.

Advantageously the ratio between equivalents of carboxylic acid group of polyester D and equivalents of component E (E1+E2) is between 45/55 to 55/45.

Optional Catalyst F

The thermosetting curing catalyst F can be selected from the group consisting of amines, imidazoles, phosphines, ammonium salts, phosphonium salts, blocked amine or phosphine catalysts, encapsulated catalysts and combinations thereof, preferably combination of arylphosphoniumhalogenide and imidazoles, more preferably ethyl-triphenylphosphonium bromide with 2-methyl-imidazole.

The total % of thermosetting curing catalyst F in the binder is between 0 and 0.5%. Advantageously the weight ratio between the powder coating based on component A, B (B1+B2) and C and the powder coating based on component D, E (E1+E2) and F is comprised between 70/30 and 40/60.

Advantageously the gloss of the final coating obtained with a dry-blend mixture as defined above is lower than 40% at 60°.

The polyester resins A and D according to the present invention may be prepared using conventional esterification techniques well known in the art.

The polyesters are preferably prepared according to a procedure consisting of one or more reaction steps. For the preparation of these polyesters, a conventional reactor equipped with a stirrer, an inert gas (nitrogen) inlet, a thermocouple, a distillation column connected to a water-cooled condenser, a water separator and a vacuum connection tube are used. The esterification conditions used to prepare the polyesters are conventional, namely a standard esterification catalyst, such as dibutyltin oxide, dibutyltin dilaurate, n-butyltin trioctoate, monobutyltin oxide, tin oxalate, sulfuric acid or a sulphonic acid, can be used in an amount from 0.0 to 0.50% by weight of the reactants and optionally, color stabilizers, for example, phosphonite- and phosphite-type stabilizers such as tributylphosphite, triphenylphosphite, can be added in an amount from 0 to 1% by weight of the reactants. Polyesterification is generally carried out at a temperature which is gradually increased from 130° C. to about 190 to 250° C., first under normal pressure, then, when necessary, under reduced pressure at the end of each process step, while maintaining these operating conditions until a polyester with the desired hydroxyl and/or acid number is obtained. The degree of esterification is monitored by determining the amount of water formed in the course of the reaction and the properties of the obtained polyester, for example, hydroxyl number, acid number, and viscosity. Final additives including catalysts, can be added in the reactor, while discharging it and/or in the powder coating preparation, during extrusion or mixing.

The thermosetting epoxy components B1, B2, E1 and E2 can be obtained by dry blending the epoxy resins using a mechanical mixing procedure as available for the premixing of the powder paint constituents. Both the bisphenol A epoxy resin and novolac epoxy resin can also be blended by extrusion such as a Buss Ko-Kneter or a APV-extruder.

Additional components can be added to the second physical mixture components D, E1, E2, F and/or to the first physical mixture comprising A, B1, B2 and C.

In addition to the components described above, compositions within the scope of the present invention can also include one or more components such as flow control agents, for example ADDITOL®P 896, MODAFLOW® P 6000 (ALLNEX), RESIFLOW®P-67 and PV5 (WORLEE), ACRONAL®4F, ACRONAL®8820 (BASF), BYK360 and BYK®361 (BYK Chemie) degassing agents such as Benzoin (BASF), fillers, UV-light absorbers such as TINUVIN®900 (BASF), hindered amine light stabilizers such as TINUVIN®144 (BASF), other stabilizing agents such as TINUVIN®312 and 1130 (BASF), antioxidants such as IRGANOX®1010 (BASF) and stabilizers of the phosphonite or phosphite types like IRGAFOS®168 (BASF), ULTRANOX® 626 (ADDIVANT) or HOSTANOX®P-EPQ (CLARIANT), pigments and dyes.

Both pigmented and clear lacquers can be prepared. A variety of dyes and pigments can be utilized in the composition of this invention. Examples of useful pigments and dyes are: metallic oxides such as titanium dioxide, iron oxide, zinc oxide and the like, metal hydroxides, metal powders, sulphides, sulphates, carbonates, silicates such as ammonium silicate, carbon black, talc, china clay, barytes, iron blues, lead blues, organic reds, organic maroons and the like.

The thermosetting powder composition usually contains less than 50% by weight of these additional components.

The components of the composition according to the invention may be mixed by dry blending in a mixer or blender (e.g. drum mixer). The premix is then generally homogenized at temperatures ranging from 50 to 120° C. in a single screw extruder such as the BUSS-Ko-Kneter or a twin screw extruder such as the PRISM or APV. The extrudate, when cooled down, is generally ground to a powder with a particle size ranging from 10 to 150 μm. The powdered composition may be deposited on the substrate by use of a powder gun such as an electrostatic CORONA gun or a friction charging TRIBO spray gun. On the other hand, well known methods of powder deposition such as the fluidized bed technique can also be used. After deposition the powder is usually heated with different heating methods including IR, to a temperature between 100 and 150° C., preferably at about 130° C. causing the particles to flow and fuse together to form a smooth, uniform, continuous, non-cratered coating on the substrate surface.

The thermosetting powder compositions according to the invention are providing an outstanding flow and permit to obtain from glossy to low gloss coatings, excellent mechanical properties and solvent resistance.

Entirely or partially coated substrates wherein the coating material used is a thermosetting powder coating composition according to the invention are also an object of the present invention.

Methods

1. Acid Value

A quantity of resin is accurately weighed out into a 250 ml conical flask. 50-60 ml of tetrahydrofuran is then added. The solution is heated gently until the resin is entirely dissolved and ensuring the solution does not boil. The solution is cooled to room temperature, then 3 drops of phenolphthalein are added before to be titrated with standard potassium hydroxide until the end point is reached. The acid value is calculated as follows:

Acid Value (mgKOH/g)=mL×$N$*56.1/g g=Mass of Resin
N=normality of potassium hydroxide solution 2. Viscosity Viscosity is measured following ASTM D 4287 using viscometer Brookfield CAP 2000 (Variable Speed) for viscosity determination of high viscosity polyesters. The required temperature and speed are selected. A small amount of the resin sample is placed on the heated plate such that when the cone is lowered, a small excess spreads out around the side. Start the rotation of the spindle. The sample is thoroughly de-gassed by raising and lowering the cone a several times, while stopping the cone rotation button. Once fully degassed, a reading is then taken. This process is repeated until a reproducible highest stable reading is obtained.

3. Tg by DSC

The Tg values reported herein are the mid point Tg's determined at the inclination point of the DSC curve. The DSC curve was determined using a heating rate of 10° C./min.

4. Molecular Weight by GPC

The weight and number average molecular weight and the molecular mass distribution of the polymers was determined with Gel Permeation Chromatography (GPC) on HPLC Perkin-Elmer with Refractive index (RI) detector using as eluent Tetrahydrofuran HPLC grade at 35° C. and three PLgel columns 100-1000-10000 Å (300×7.8 mm) 5 microns, Polymer Standards Services (PSS) using Polystyrene standards (M range 162 to 96000 Daltons) and Toluene added on every samples as flow marker peak.

5. Functionality

Functionality defined as the average number of acid or glycidyl groups per molecule as calculated by Mn/(56100/AV) or Mn/EEW.

6. Epoxy Equivalent Weight (EEW)

The epoxy equivalent weight is the weight of an epoxy compound containing exactly one mole of epoxy groups, expressed in g/mol.

A quantity of resin equivalent to 0.7-0.8 milliepoxide equivalent accurately weighed out into a 250 ml conical flask. 20 ml of methylene chloride are then added. The solution is heated gently until the resin is entirely dissolved and ensuring the solution does not boil. The solution is cooled to room temperature. Then, with a cylinder, about 0.5-1 g of tetraethylammoniumbromide powder and 4-6 drops of crystal violet indicator are added (colour changes from blue to green).

Then it's titrated immediately by magnetic stirring with the 0.1 N perchloric acid solution until the end point is reached.

Calculation

Epoxide equivalent weight=($P$*1000)/(($V$–$V_0$)*$N$)g/epoxy equivalent

Where:
V=ml of 0.1N perchloric acid solution used to titrate the sample
Vo=ml of 0.1N perchloric acid solution used to titrate the blank solution
N=normality of perchloric acid
P=sample weight expressed in grams

EXAMPLES

Example 1 Polyester A 1194.8 parts of neopentyl glycol and 285.8 parts of diethylene glycol were placed in a conventional four neck round bottom flask equipped with a stirrer, a distillation column connected to a water cooled condenser, an inlet for nitrogen and a thermometer attached to a thermoregulator. The flask contents were heated, while stirring under nitrogen, to a temperature of circa 140° C. at which point 1914.1 parts of terephthalic acid, 206.3 parts of adipic acid and 4.0 parts of tin-oxalate were added. The reaction was continued at 240° C. under atmospheric pressure until about 95% of the theoretical amount of water was distilled and a transparent hydroxyl functionalized prepolymer was obtained.

To the first step prepolymer at 200° C., 3.2 parts of triphenylphosphite were added and at a temperature of 235° C. vacuum of 50 mm Hg was gradually applied. Once the target acid value and viscosity were achieved the polyester was cooled at 200° C. and 414 parts of trimellitic anhydride, 52.6 parts of triphenyl-ethyl-phosphonium-bromide (BETP) were added. After 60' following characteristics were obtained:

Acid Value 69.5 mg KOH/g
Brfld (Cone/Plate) 4800 mPa·s at 175° C.
Tg (DSC) 53° C.
Molecular weight distribution of: Mn 2051/Mw 6217
Functionality: 2.6

Example 2 Polyester E 1489.7 parts of neopentyl glycol, 72.0 parts of ethylene glycol and 8.6 parts of trimethylolpropane were placed in a conventional four neck round bottom flask equipped with a stirrer, a distillation column connected to a water cooled condenser, an inlet for nitrogen and a thermometer attached to a thermoregulator. The flask contents were heated, while stirring under nitrogen, to a temperature of circa 140° C. at which point 2340 parts of terephthalic acid, and 9.0 parts of butyl-tin-trisoctanoate were added. The reaction was continued at 240° C. under atmospheric pressure until about 95% of the theoretical amount of water was distilled and a transparent hydroxyl functionalized prepolymer was obtained.

To the first step prepolymer at 200° C., 247.7 parts adipic acid and 3.2 parts of triphenylphosphite were added and after 3 hours a vacuum of 50 mm Hg was gradually applied. Once target acid value and viscosity were achieved, the polyester was cooled at 200° C. and following characteristics were obtained:

Acid Value 19.4 mg KOH/g
Brfld (Cone/Plate) 8400 mPa·s at 200° C.
Tg (DSC) 53° C.
Molecular weight distribution: Mn: 3800, Mw: 12962
Functionality: 1.3
Bisphenol A epoxy resin type:
Epoxy Equivalent weight: 525 g/equivalent:
Brfld (Cone/Plate) 700 mPa·s at 150° C.
Tg (DSC) 38° C.
Molecular weight distribution: Mn: 720 and Mw 2317
Functionality: 1.4
Cresol novolac epoxy:
Epoxy Equivalent weight: 205 g/equivalent:
Brfld (Cone/Plate) 2400 mPa·s at 150° C.
Tg (DSC) 45.5° C.
Molecular weight distribution: Mn: 853 and Mw 2767
The polyesters: 4.2

The polyesters and the epoxy resins as illustrated above, were then formulated to a powder according to the formulation as mentioned below.

White Paint Formulation

| Binder | 72.7 |
|---|---|
| Kronos TR2160 | 25.3 |
| Modaflow P 6000 | 1.3 |
| Benzoin | 0.7 |

The binder composition of the different powder formulations is given in the table below.

The powders were prepared first by dry blending in a bag the different solid components and then by homogenization in the melt using a ZSK-30P extruder at an extrusion temperature of about 100° C. with a speed of 450 rpm. The homogenized mix was then cooled and grinded with Vortisiv. Subsequently the powder was sieved to obtain a particle size lower than 200 meshes. The powder thus obtained was deposited on MDF or Q-Panel CRS 0.02"×3"×5 inches by electrostatic deposition using the GEMA—Optiflex-2 spray gun. At a film thickness of about 3 mils (ca. 70 microns) the panels were IR cured or transferred to an air-ventilated oven, where curing was proceeded for 15 minutes at a temperature of 125° C.

The Powder coating formulations (components and amounts) are reported in table 1.

TABLE 1

| Row | Component | Powd 1 | Powd 2 | Powd 3 | Powd 4R | Powd 5R |
|---|---|---|---|---|---|---|
| 1 | Polyester 1 | 50 | 50 | 50 | 50 | |
| 2 | 2 methyl-imidazole | 0.55 | 0.4 | 0.3 | 0.3 | |
| 3 | Polyester of Example 6 WO96/24628 | | | | | 37 |
| 4 | Bisphenol A epoxy type | 42 | 42 | 42 | 50 | |
| 5 | Cresol novolac epoxy | 8 | 8 | 8 | | |
| 6 | Epoxy resin of Example 1 WO96/24628 | | | | | 33 |
| 7 | MODAFLOW P 6000 | 1.8 | 1.8 | 1.8 | 1.8 | 1 |
| 8 | BENZOIN | 1 | 1 | 1 | 0.5 | |
| 9 | 1.3-phenoxy-2-propanol 98% | | | | | 1 |
| 10 | Titanium dioxide KRONOS TR 2160 | 35 | 35 | 35 | 35 | 28 |
| 11 | Total | 138.35 | 138.2 | 1338.18 | 137.6 | 100 |

TABLE 2

| Row | Ratio | Powd 1 | Powd 2 | Powd 3 | Powd 4R |
|---|---|---|---|---|---|
| 1 | Ratio equiv. carboxylic acid groups/equiv. epoxy groups | 34/66 | 34/66 | 34/66 | 39/61 |
| 2 | Ratio equiv. bisphenol A epoxy/equiv. novolak epoxy | 67/33 | 67/33 | 67/33 | 100/0 |
| 3 | % of total catalyst in the binder | 1.3 | 1.2 | 1.1 | 1.1 |

The paint characteristics for the finished coatings obtained from a binder according to the invention (Powd 1. Powd 2. Powd 3) and references (Powd 4R and 5R) are given in table 2.

TABLE 3

| Row | Property | Powd 1 | Powd 2 | Powd 3 | Powd 4R | Powd 5R |
|---|---|---|---|---|---|---|
| 1 | GEL TIME at 200° C. | 30 | 31 | 32 | 31 | |
| 2 | GEL-TIME at 180° C. | 35 | | | | 107 |
| 3 | PILL FLOW | 41 | 44 | 47 | 43 | |
| 4 | MEK 50 DLR (10@125) | 3 | 3 | 3 | 1 | |
| 5 | Impact (F): 10@125° C. | 20 | 20 | 20 | 0 | |
| 6 | Erichsen cupping DIN 53156 20' at 140° C. mm | 10.7 | | | | 7.5 |
| 7 | Gloss at (60°) 10' at 125° C. | 104 | 104 | 104 | 104 | |
| 8 | Smoothness (MDF) PCI | 7 | 7 | 7 | 7 | |

In the same table are given, as comparative examples (Powd 4R and Powd 5R), the paint performances of finished coatings obtained from a binder a) exempt from cresol novolac epoxy, or based on combination of bisphenol A epoxy and liquid epoxy novolac as from the example described in WO96/24628.

Row 1 and Row 2: indicate gel time measured specifically at 200° C. and 180° C.

Row 3: indicates the melt flow in mm measured at 140° C., where a short flow is linked to a strong orange peel while a longer one stands for a smoother coating.

Row 4: indicate the resistance to MEK, which corresponds to the appearance of the surface of the cured film (1=poor to 4=excellent) after 50 twofold rubbing movements (to and fro) with a cotton pad impregnated with detrimentally affecting MEK.

Row 5: indicates the reverse impact strength according to ASTM D2794. The highest impact which does not crack the coating is recorded in kg·cm.

Row 6: indicated the Erichsen cupping according to DIN53156.

Row 7: indicates the gloss at 60° of the powder coatings.

Row 8: indicates the visual evaluation where 10 stands for very smooth high gloss coating and 1 stands for strong orange peel coating with a reduced gloss 60° value.

The powders accordingly the invention (Powd 1, Powd 2 and Powd 3) produced nice smooth coatings with very good flow and solvent resistance upon curing at 125'C for 10' min.

Besides gloss and flow comparable to the coating Powd 4R, the powder coating compositions of the invention provided an excellent solvent resistance and flexibility not achievable at these low temperatures with the currently used standard commercial polyester based powders.

Additional tests have been done modifying the ratio Polyester N Epoxy B1+B2 and using different percentage and catalyst C.

TABLE 4

| Row | Component | Powd 6 | Powd 7 | Powd 8 | Powd 9 |
|---|---|---|---|---|---|
| 1 | Polyester 1 | 65.6 | 65.6 | 65.9 | 45.5 |
| 2 | 2 methyl-imidazole | 1.2 | | | |
| 3 | Triphenyl-ethyl-phosphonium-bromide | | 0.7 | | 0.5 |
| 4 | Bisphenol A epoxy type | 28.9 | 28.9 | 28.6 | 45.5 |
| 5 | Cresol novolac epoxy | 5.5 | 5.5 | 5.5 | 9 |
| 6 | MODAFLOW P 6000 | 1.8 | 1.8 | 1.8 | 1.8 |
| 7 | BENZOIN | 1 | 1 | 1 | 1 |
| 8 | Titanium dioxide KRONOS TR 2160 | 35 | 35 | 35 | 35 |
| 9 | Total | 139.0 | 138.5 | 137.8 | 138.3 |

TABLE 5

| Row | Ratio | Powd 6 | Powd 7 | Powd 8 | Powd 9 |
|---|---|---|---|---|---|
| 1 | Ratio equiv. carboxylic acid groups/equiv. epoxy groups | 50/50 | 50/50 | 50/50 | 30/70 |
| 2 | Ratio equiv. bisphenol A epoxy/equiv. novolak epoxy | 67/33 | 67/33 | 67/33 | 67/33 |
| 3 | % of total catalyst in the binder | 2.2 | 1.7 | 1.0 | 1.2 |

TABLE 6

| Row | Property | Powd 6 | Powd 7 | Powd 8 | Powd 9 |
|---|---|---|---|---|---|
| 1 | GEL TIME at 200° C. | 28 | 29 | 38 | 28 |
| 2 | GEL-TIME at 140° C. | 100 | 99 | 160 | 97 |
| 3 | PILL FLOW | 39 | 38 | 45 | 37 |
| 4 | MEK 50 DLR (10@125) | 3.5 | 3.5 | 3.5 | 3.5 |
| 5 | Impact (F): 10 @125° C. | 20 | 20 | 10 | 20 |
| 6 | Erichsen cupping DIN 53156 20' at 140° C. mm | | | | |
| 7 | Gloss at (60°) 10' at 125° C. | 102 | 103 | 103 | 101 |
| 8 | Smoothness (MDF) PCI | 6 | 8 | 9 | 6 |

Powd 1 was also able to provide, at this low temperature, a matt coating in combination with selected powder coating similarly based on a white paint formulation.

White Paint Formulation

| | |
|---|---|
| Binder | 73.0 |
| Kronos TR2160 | 25.0 |
| Modaflow P 6000 | 1.3 |
| Benzoin | 0.7 |

Table 7 shows the details (components and amounts) of Powd 10.

TABLE 7

| Row | Component | Powd 10 |
|---|---|---|
| 1 | Polyester 2 | 84.0 |
| 2 | Standard (bisphenol A) epoxy | 18.0 |
| 3 | MODAFLOW P 6000 | 1.8 |
| 4 | BENZOIN | 1.0 |
| 5 | Titanium dioxide KRONOS TR 2160 | 35.0 |
| 6 | Total | 139.8 |

Powd 10 has been similarly prepared and tested for gel-time at 200° C. and found longer than 600 seconds.

When dry-blending the powder coating composition 10 in different ratio with Powd 1 it had been surprisingly found that it was possible to obtain a low gloss level still maintaining very good flow and solvent resistance as reported in table 8.

TABLE 8

| Row | | Powd 11 | Powd 12 | Powd 13 | Powd 14 |
|---|---|---|---|---|---|
| 1 | Powd 1 parts | 50 | 60 | 70 | 80 |
| 2 | Powd 10 parts | 50 | 40 | 30 | 20 |
| 3 | IR curing 10'@125° C. | | | | |

TABLE 8-continued

| Row | | Powd 11 | Powd 12 | Powd 13 | Powd 14 |
|---|---|---|---|---|---|
| 4 | support | MDF | MDF | MDF | MDF |
| 5 | gloss at 60° | 31 | 35 | 37 | 67 |
| 6 | Smoothness PCI | 8 | 8 | 8 | 7 |
| 7 | MEK 50 DLR | 3 | 3 | 3 | 3 |

Row 6: indicates the gloss at 60° of the powder coatings as requested for the matt coating.

Gloss, smoothness and solvent resistance are quite stable in a broad range of ratios between the 2 components powders.

Similar behaviour is observed by substituting the powder coating composition 1 with any of the powder coating compositions 6, 7, 8 and 9 characterized from a modified ratio between carboxylic groups and epoxy groups and a different type and percentage of catalyst C.

TABLE 9

| Row | | Powd 15 | Powd 16 | Powd 17 | Powd 18 |
|---|---|---|---|---|---|
| 1 | Powd 6 parts | 50 | | | |
| 1' | Powd 7 parts | | 50 | | |
| 1'' | Powd 8 parts | | | 50 | |
| 1''' | Powd 9 parts | | | | 50 |
| 2 | Powd 10 parts | 50 | 50 | 50 | 50 |
| 3 | IR curing 10'@125° C. | | | | |
| 4 | support | MDF | MDF | MDF | MDF |
| 5 | gloss at 60° | 35 | 36 | 36 | 34 |
| 6 | Smoothness PCI | 8 | 8 | 9 | 8 |
| 7 | MEK 50 DLR | 3 | 3 | 3 | 3.5 |

The invention claimed is:

1. A powder coating composition for curing at low temperature between 100° C. and 150° C. which comprises:
    a. a carboxylic acid functional resin A which is a polyester resin A having carboxylic acid groups,
    b. a first glycidyl functional resin B1 which is a bisphenol A based epoxy resin having glycidyl groups,
    c. a second glycidyl functional resin B2 which is a phenol or cresol epoxy novolac resin having glycidyl groups, and
    d. at least one thermosetting curing catalyst C,
    wherein the ratio between equivalents of bisphenol A epoxy resin (number of moles of epoxy groups in B1 resin) and equivalents of phenol or cresol epoxy novolac resin (number of moles of epoxy groups in B2) is between 70/30 to 55/45.

2. The composition according to claim 1, wherein the composition does not comprise a crystalline polyester resin containing carboxyl group with an arithmetically average acid number of 15 to 80 mg KOH/g or a semicrystalline polyester resin containing carboxyl group with an arithmetically average acid number of 15 to 80 mg KOH/g.

3. The composition according to claim 1, wherein the polyester resin A has one or more of the following characteristics:
    a. the polyester resin A has an acid number of at least 50 mg KOH/g, and/or a hydroxyl number less than 10 mg KOH/g,
    b. the polyester resin A has a number average molecular weight (Mn) as determined by gel permeation chromatography (GPC) of at least 1000,
    c. the polyester resin A is an amorphous resin,
    d. the polyester resin A has a functionality of at least 2.0.

4. The composition according to claim 1, wherein the epoxy resin B1 has at least one of the following characteristics:
    a. the epoxy resin B1 has an epoxy equivalent weight of at least 450,
    b. the epoxy resin B1 has a number average molecular weight (Mn) as determined by gel permeation chromatography (GPC) of at least 500.

5. The composition according to claim 1, wherein the epoxy resin B1 has a glass transition temperature, measured by Differential Scanning calorimetry (DSC) according to ASTM D3418 with a heating gradient of 10° C. per minute, of from 30 to 45° C.

6. The composition according to claim 1, wherein the epoxy resin B1 has functionality lower than 2.0, (wherein functionality is defined as the average number of glycidyl groups per molecule as by "calculated Mn"/EEW.

7. The composition according to claim 1, wherein the epoxy resin B2 has an epoxy equivalent weight of at least 190 g/equivalent.

8. The composition according to claim 1, wherein the epoxy resin B2 has a number average molecular weight (Mn) as determined by gel permeation chromatography (GPC) of at least 700.

9. The composition according to claim 1, wherein the epoxy resin B2 has a glass transition temperature, measured by Differential Scanning calorimetry (DSC) according to ASTM D3418 with a heating gradient of 10° C. per minute, of from 38 to 53° C.

10. The composition according to claim 1, wherein the epoxy resin B2 has a functionality comprised between 3.0 and 6.0, wherein functionality is defined as the average number of glycidyl groups per molecule as by "calculated Mn"/EEW.

11. The composition according to claim 1, wherein the ratio between equivalents of carboxylic acid group of polyester A (number of moles of carboxylic groups in resin A) and equivalents of component B (the sum of epoxy groups in B1 and B2) is between 25/75 to 55/45.

12. The composition according to claim 1, wherein the ratio between equivalents of carboxylic acid group of polyester A (number of moles of carboxylic groups in resin A) and equivalents of component B (the sum of epoxy groups in B1 and B2) is between 25/75 to 45/55.

13. A powder coating composition according to claim 1, mixed in dry-blend with a powder coating comprising:
    a. at least one carboxylic acid group containing polyester resin D,
    b. at least one bisphenol A based epoxy resin E1,
    c. optionally at least one phenol or cresol epoxy novolac resin E2, and
    d. optionally one thermosetting curing catalyst F.

14. The powder coating composition according to claim 13 wherein curing the physical mixture of the coating composition comprising D, E1, E2 if present, F if present, with the powder coating composition comprising A, B1, B2 and C components provides a matt coating having a gloss lower than 40% at 60°.

15. A process for coating substrates comprising the steps of coating at least one surface of said substrate with a powder coating composition of claim 1; and heating the coated substrate to thermally cure the coating thereon to form an adherent layer of the coating composition on the substrate.

16. An article coated, either partly or entirely, with a coating composition of claim 1.

* * * * *